United States Patent
Tweel

(10) Patent No.: US 10,959,568 B2
(45) Date of Patent: Mar. 30, 2021

(54) INDUCTIVE HEATING VESSELS AND METHODS OF MAKING AND USING SAME

(71) Applicant: Patrick M. Tweel, Atlanta, GA (US)

(72) Inventor: Patrick M. Tweel, Atlanta, GA (US)

(73) Assignee: Patrick M. Tweel, Atlanta, GA (US)

( * ) Notice: Subject to any disclaimer, the term of this patent is extended or adjusted under 35 U.S.C. 154(b) by 54 days.

(21) Appl. No.: 16/273,087

(22) Filed: Feb. 11, 2019

(65) Prior Publication Data

US 2019/0246833 A1    Aug. 15, 2019

Related U.S. Application Data

(60) Provisional application No. 62/628,554, filed on Feb. 9, 2018.

(51) Int. Cl.
*A47J 36/02* (2006.01)
*A47J 41/00* (2006.01)
*A47J 27/21* (2006.01)
*H05B 6/12* (2006.01)

(52) U.S. Cl.
CPC .............. *A47J 36/025* (2013.01); *A47J 27/21* (2013.01); *A47J 41/0055* (2013.01); *H05B 6/1209* (2013.01)

(58) Field of Classification Search
CPC ...... A47J 36/025; A47J 41/0055; A47J 27/21; A47J 41/0061; A47J 27/002; A47J 36/00–022; A47J 36/027–42; H05B 6/1209; B65D 3/22; B65D 5/0281; B65D 7/04; B65D 81/34–3897; B65D 90/06; B65D 11/02; B65D 2581/34–3498; B65D 83/72; B65D 2585/683; B65D 2585/682
See application file for complete search history.

(56) References Cited

U.S. PATENT DOCUMENTS

| | | | | |
|---|---|---|---|---|
| 3,134,007 A | * | 5/1964 | Niblo | H05B 3/683 219/447.1 |
| 3,745,290 A | | 7/1973 | Harnden, Jr. et al. | |
| 3,777,094 A | | 12/1973 | Peters, Jr. | |
| 3,843,857 A | * | 10/1974 | Cunningham | G05D 23/26 219/622 |
| 3,906,181 A | * | 9/1975 | Hibino | H01F 27/24 219/622 |
| 3,979,572 A | | 9/1976 | Ito et al. | |
| 4,749,836 A | * | 6/1988 | Matsuo | H05B 6/062 219/626 |
| 5,487,329 A | * | 1/1996 | Fissler | A47J 36/02 99/403 |
| 5,711,602 A | * | 1/1998 | Rohring | A47J 36/165 366/251 |
| 5,979,673 A | * | 11/1999 | Dooley | A47J 47/16 211/41.11 |

(Continued)

FOREIGN PATENT DOCUMENTS

GB    2492121 A    12/2012

*Primary Examiner* — Kareen K Thomas

(57) ABSTRACT

Disclosed herein are induction heating articles and vessels and methods for applying insulating coatings thereto. In one aspect, an induction heating vessel of the present invention includes a ferromagnetic substrate and an insulating coating layer attached to the substrate, the insulating coating layer being characterized by a thermal conductivity of less than about 1.0 W/mK and a Shore A hardness of less than about 70.

16 Claims, 10 Drawing Sheets

(56) References Cited

U.S. PATENT DOCUMENTS

| | | | |
|---|---|---|---|
| 6,300,603 B1* | 10/2001 | Edwards | H05B 3/68 |
| | | | 219/447.1 |
| 8,602,248 B2 | 12/2013 | Mathieu | |
| 8,754,351 B2 | 6/2014 | England et al. | |
| 9,215,758 B2* | 12/2015 | Imura | F24C 15/105 |
| 10,104,721 B2 | 10/2018 | England et al. | |
| 2006/0057365 A1* | 3/2006 | Swoboda | B65D 65/42 |
| | | | 428/323 |
| 2016/0234888 A1 | 8/2016 | Beverly | |
| 2017/0150840 A1 | 6/2017 | Park | |

\* cited by examiner

900

INDUCTIVE HEATING VESSELS AND METHODS OF MAKING AND USING SAME

CROSS REFERENCE TO RELATED APPLICATIONS

This application claims the benefit of priority to U.S. Provisional Application No. 62/628,554, filed on Feb. 9, 2018, which is incorporated by reference herein in its entirety.

TECHNICAL FIELD

The present disclosure generally relates to coated articles and vessels, more specifically induction cooktop vessels having improved performance and usability through means of insulation, aesthetics, stability, safety and scratch-minimization and methods for making thereof.

BACKGROUND

Cooktops such as electric and gas rely on thermal energy transfer as the primary means of heating cookware. The cookware, therefore, depends on conductive materials on the exterior to facilitate the energy transfer. Induction cooktops, however, use electromagnetic induction as the energy transfer means and therefore don't require thermally conductive materials on the exterior of heating vessels to facilitate directing heat to the items being heated. It would be advantageous to cover the exterior of the induction-compatible heating vessel with materials that offer alternative or additional benefits that ferromagnetic materials may not offer.

Thus, there is a need to address these problems and other shortcomings associated with inductive heating vessels. This need and other needs are satisfied by the various aspects of the present disclosure.

SUMMARY

In accordance with the purpose(s) of the invention, as embodied and broadly described herein, this disclosure, in one aspect, relates to induction heating articles and vessels and methods for applying insulating coatings thereto.

In one aspect, the present disclosure provides an induction heating vessel comprising an inner ferromagnetic substrate and an outer insulating layer.

In another aspect, the present disclosure provides method for coating a ferromagnetic substrate, the method comprising contacting at least a portion of a ferromagnetic substrate with an insulative coating formulation to form an outer first coating.

In another aspect, the present disclosure provides an article produced by the method described above.

In another aspect, the present disclosure provides an inductive cooking article comprising a ferromagnetic substrate and an insulating coating attached to the substrate.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DESCRIPTION

Figure 1:
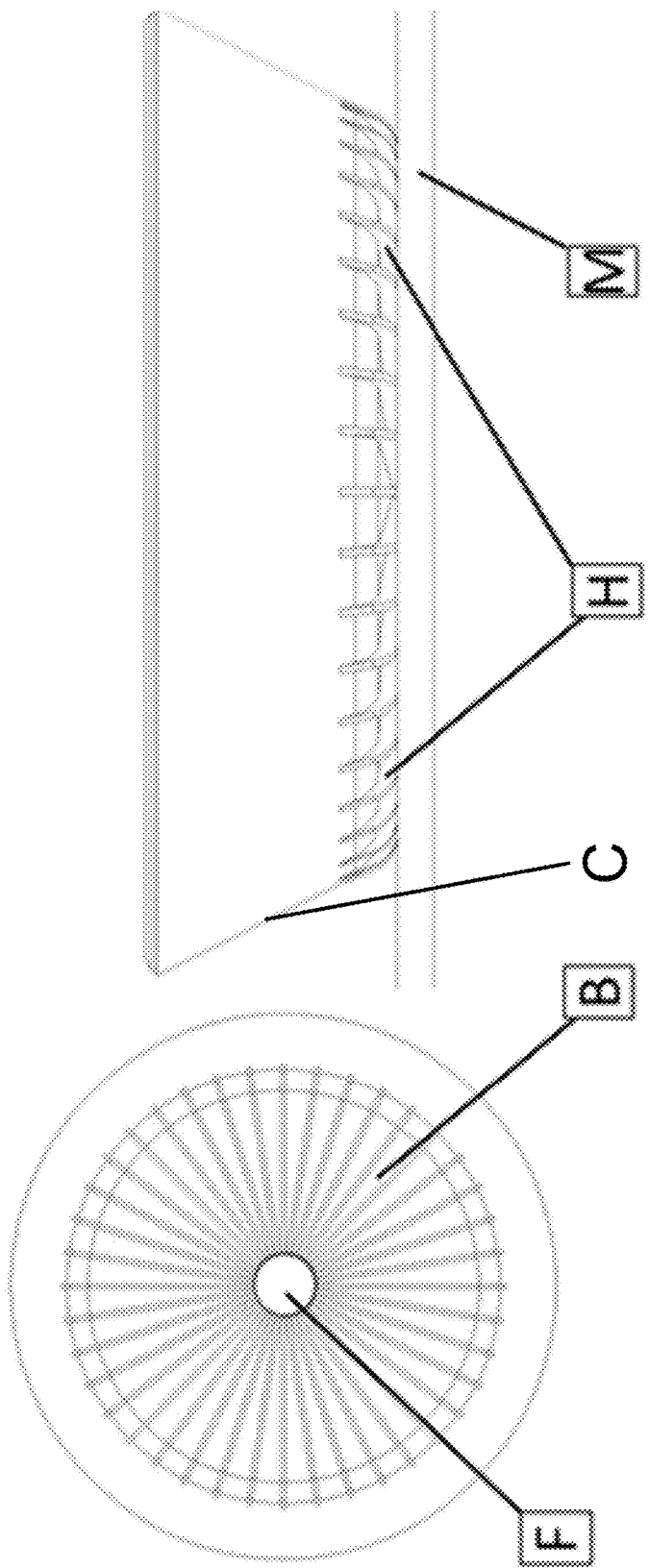
FIG. 1 illustrates a heating vessel in accordance with an exemplary embodiment of the present invention.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular components unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Definitions

As used in the specification and the appended claims, the singular forms "a," "an" and "the" include plural referents unless the context clearly dictates otherwise. Thus, for example, reference to "a coating" or "a material" includes mixtures of two or more coatings or materials.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

Disclosed are the components to be used to prepare the compositions and articles of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly discussed above, the present disclosure, in one aspect, provides compositions and methods for preparing durable, non-skid, insulating coatings for induction heating articles and vessels. In further aspects, the methods of the present invention comprise applying a single layer coating to a ferromagnetic substrate. In other aspects, the methods of the present invention comprise applying an insulating coating to a ferromagnetic substrate, and applying a surface treatment which can impart further insulative or cooling properties to the surface.

The various methods and compositions of the present disclosure can provide a durable, insulating coating for ferromagnetic surfaces. Many traditional coatings may impart non-skid or non-scratching properties, but do not provide adequate insulating properties to the surface to allow a user to come in contact with or grasp it. The methods and compositions described herein relate to a coating process comprising, in one aspect, a single insulating coating layer. The resulting coating layer and coated articles and vessels can have a durable, low surface hardness and insulating exterior. In further aspects, the coated articles and vessels can have improved performance and usability through means of insulation, aesthetics, stability, safety or scratch-minimization, and combinations thereof.

In various aspects, a substrate of the present invention can comprise any ferromagnetic material suitable for use in the various articles and methods described herein. In one aspect, the substrate may also comprise conductive materials such as, but not limited to, copper, aluminum, titanium, porcelainized iron, chromium, nickel, iron or steel, or combinations thereof. In another aspect, the substrate can comprise an article of cookware, heating vessel or a precursor thereto. In another aspect, the substrate can comprise cookware, a vessel, a kettle, a pot, or a combination thereof. In still other aspects, the substrate can comprise any steel, iron cobalt, or nickel material suitable for induction cooking applications in which durable, exterior insulating layer is desirable, and the present invention is not intended to be limited to any particular substrate or application.

In one aspect, the substrate of the present invention can comprise any conductive material appropriate for coating with the insulating materials and compositions described herein. In various aspects, the substrate can comprise conductive materials such as, but not limited to, copper, aluminum, titanium, porcelainized iron, chromium, nickel, iron or steel, or combinations thereof. In another aspect, the substrate can comprise a steel, gray cast iron, white cast iron, ductile cast iron, malleable cast iron, chilled cast iron, mottled cast iron, compacted cast iron, high-alloy cast iron, or combination thereof. In yet another aspect, the substrate of the present invention is at least one of the following: formable, bendable, shapeable, machinable, castable, capable of being coated or overmolded with an insulating material, and/or a combination thereof. In yet another aspect, the substrate of the present invention is shapeable and capable of being coated or overmolded with a disclosed insulating composition. In still another aspect, the substrate of the present invention can comprise any chemical composition or alloy suitable for use in the methods and articles recited herein. In still other aspects, the substrate of the present invention can comprise additional elements not recited herein. In still further aspects, the substrate of a portion thereof can comprise one or more additional metals or alloys thereof.

In further aspects, the ferromagnetic substrate or cooking surface may further comprise a non-stick coating or layer. Additionally, said exterior cooking surface may include surface finishes or processes to impart "non-stick" properties, such as to avoid the food or liquid being heated from adhering to the surface. Such "non-stick" surfaces are common in heating vessels to promote desired separation between heating liquid or food and heating vessel at the intended time. As used herein, the term "non-stick" is intended to refer to the ability to remove food or cooking products from the surface. Non-stick is intended to mean that all or substantially all food or cooking products can be easily removed without adhering to the cooking surface, but does not necessarily mean that no portion of a food or cooking product will adhere.

In further aspects, the substrate can comprise one or multiple, for example, 2, 3, 4 or more, individual layers or plys of a ferromagnetic material or composition. In one aspect, the ferromagnetic substrate comprises a single layer or ply. In another aspect, the ferromagnetic substrate comprises at least two layers or ply, for example, 3 or 4 layers or ply. In further aspects, the ferromagnetic substrate is intended to receive the electromagnetic induction produced by the electromagnetic induction cooktop. Ferromagnetic materials are common and accepted as the primary means for induction cooking. Described embodiments may contain additional metal or insulating layers to increase thermal performance of cookware. Multiple metal layers are common for cookware to enhance thermal uniformity or thermal production of cookware for use in induction cooktops. Additional layers of insulation may enhance thermal performance of cookware by minimizing the thermal escape from the desired heating region. As will be described in more detail with respect to the disclosed articles and vessels, the substrate of the present invention can also comprise any suitable geometry, physical form, and thickness. In one aspect, the geometry, physical form, and thickness of a substrate is dependent upon the intended application, such as, for example, a kettle. The geometry and thickness of a substrate can also be dependent upon, for example, the heat retention and diffusion characteristics that are desired as detailed herein.

The insulating coating of the present invention can comprise any insulating composition or formulation capable of application to a ferromagnetic substrate and meeting the durometer hardness and thermally insulative requirements disclosed herein. In one aspect, the insulating coating comprises a base material and an optional thermally insulative filler. In another aspect, the insulating coating comprises a two part formulation comprising a base material and a thermally insulative filler. In further aspects, insulating coating layer comprises an insulating composition comprising: (i) from 51 to 100 vol % of a base material, and (ii) from 0 to 49 vol % of a thermally insulative filler with an intrinsic thermal conductivity less than about 1.0 W/mK. In still further aspects, the insulating composition performance may be measured or otherwise characterized by: (1) a thermal conductivity of less than about 1.0 W/mK; (2) a Shore A Hardness of less than about 70; and (3) a (Shore A hardness-"durometer"$-47)^3$ times thermal conductivity value of no greater than about 40. Preferred material is present within the Shore A scale In further aspects, the insulating composition can comprise from greater than about 50 to 100 vol % of a base material, for example, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 vol %. In still further aspects, the base material can a Shore A Hardness of less than about 70, for example, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1, or less. The base material can comprise silicone, urethanes, silica-derived insulation materials, polyolefins, polyamide-imides, polyphenylene sulfide, polyphenylene oxide, polystyrene, graphite, PTFE, polycarbonate plastic high temperature foam, moly or TPSiV (thermoplastic silicone vulcanization), or combinations thereof.

In further aspects, the insulating composition can comprise from 0 to 49 vol % of a thermally insulative filler, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 vol %. In yet further aspects, thermally insulative filler can have an intrinsic thermal conductivity less than about 1.0 W/mK, for example, about 0.9, 0.8, 0.7, 0.6, 0.5, 0.4, 0.3, 0.2, or 0.1 W/mK, or less. The insulative filler may comprise borosilicate glass, glass bead, glass fiber, $H_2Mg_3(SiO_3)_4$ (Talc), $CaCO_3$ (Calcium Carbonate), $Mg(OH)_2$ (Magnesium hydroxide), Mica, BaO (Barium oxide), γ-AlO(OH) (Boehmite), γ-AlO(OH) (Diaspore), $Al(OH)_3$ (Gibbsite), $BaSO_4$ (Barium sulfate), $CaSiO_3$ (Wollastonite), $ZrO_2$ (Zirconium oxide), $SiO_2$ (Silicon oxide), soda-lime-borosilicate glass, $MgO.xAl_2O_3$ (Magnesium aluminate), $CaMg(CO_3)_2$ (Dolomite), aerogel, cork, or a clay, or combinations thereof.

The components, thermal conductivity, and durometer hardness of exemplary insulating formulations are detailed in Table 1, below. The specific chemical composition of the insulating coating can vary, provided that it can bond and/or adhere to the substrate without bubbling and/or peeling, and that it can provide a durable and insulating surface that can be touched or grasped after the substrate has been heated to high temperatures. It should be noted that the specific components and concentrations of any individual insulative coating formulation or composition can vary depending upon, for example, the substrate material.

TABLE 1

Exemplary Insulating Coating Formulation

| Material Combination | Thermal Conductivity (TC) (W/mk) | Durometer (Shore A) | TC*(Durometer$-47)^3$ |
|---|---|---|---|
| Metal | 50.00 | 100 (greater than) | 7443850 |
| Polycarbonate | 0.19 | 95 | 21012 |
| Vacuum insulation with polycarbonate | 0.00 | 95 | 111 |
| Vacuum insulation with metal | 0.00 | 100 (greater than) | 149 |
| Conductive insulation with polycarbonate | 0.17 | 95 | 18801 |
| Silicone | 0.19 | 50 | 5 |
| High-durometer silicone with a soda-lime-borosilicate glass | 0.17 | 50 | 5 |
| Low-durometer silicone with minor insulation additive | 0.19 | 20 | −3740 |
| High-durometer silicone with aerogel | 0.03 | 50 | 1 |

In another aspect, an insulating coating formulation can comprise optional additional components, such as, for example, various additives. Mixtures of additives can be used. Such additives can be mixed at a suitable time during the mixing of the components for forming the insulating formulation or composition. The one or more additives are included in the insulating compositions to impart one or more selected characteristics or properties to the insulating compositions and any coated article made therefrom. In one aspect, such optional additional components can be used to adjust and/or control the thermal conductivity, rheology and/or thermochromic properties of an insulating formulation. Non-limiting examples of additives that can be included in the present invention include, but are not limited to, thermochromic additives, such as, for example, leuco dyes or liquid crystals, pigments, dyes, colorants, or a combination of one or more of the foregoing additives. Thermochromic additives change color in response to certain temperature ranges. Such thermochromic additives provide visual indicators to the user of the thermal status which is relevant to safety or damage to surfaces it comes in contact with.

In one aspect, the insulating coating formulation can comprise a solution. In another aspect, the insulating coating formulation can comprise a liquid. In yet another aspect, the insulating coating formulation can comprise a paste. In still another aspect, the insulating coating formulation can be contacted with at least a portion of the substrate so as to provide a uniform or substantially uniform coating.

The manner in which the insulating coating formulation is contacted with or applied to the substrate can vary, depending upon, for example, the physical form of the substrate and the desired thickness of the resulting coating. In one aspect, a liquid insulating coating formulation can be overmolded onto at least a portion of a substrate. In other aspects, the insulating coating formulation can be sprayed or coated onto at least a portion of the substrate. In still other aspects, the insulating coating formulation can be contacted and/or deposited via vapor deposition. In still other aspects, the insulating coating formulation can be contacted and/or deposited via lamination processes. In still other aspects, the insulating coating formulation can be contacted and/or deposited via rolling processes.

In various aspects, the thickness of an insulating coating or layer can be from about 0.18 inches to about 1.0 inches, for example, about 0.2, 0.25, 0.3, 0.35, 0.4, 0.45, 0.5, 0.55, 0.6, 0.65, 0.7, 0.75, 0.8, 0.85, 0.9, or 0.95 inches; or from about 0.25 to about 0.75 inches, for example, about 0.3, 0.35, 0.4, 0.45, 0.5, 0.55, 0.6, 0.65, or 0.7 inches. In other aspects, the thickness of an insulating coating or a portion thereof can be less than about 0.25 inches, for example, about 0.2, 0.18, 0.15, 0.1, 0.05, or 0.01 inches, and the present invention is not intended to be limited to any particular thickness.

In one aspect, an insulating coating provides a coating that covers at least a portion of a substrate. In one aspect, the insulating coating is free of or substantially free of openings or defects, such as, for example, openings or holes wherein heat generated by the substrate can escape and/or wherein liquid could permeate the opening and contact the substrate. In another aspect, the insulating coating is durable and capable of withstanding high temperatures. In another aspect, the insulating coating is capable of withstanding the stresses associated with handling, storage, and use of induction heating cookware or vessels. In yet another aspect, the insulating coating is well bonded or adhered to the substrate and can resist bubbling or peeling from the substrate surface. In still another aspect, there is no gap or substantially no gap between the insulating coating and the substrate. In conjunction with insulating properties, the insulating coating may have a high-temperature tolerance without significant short-term or long-term deformation. High-temperature tolerance in the insulating coating is advantageous because of exposure to high temperature as described herein. Other coating materials may be used that offer similar properties in thermal tolerance, durometer and insulation properties as the exemplary coating formulations and compositions.

Generally, it is understood that the lower thermal conductivity of a material or materials yields better thermally isolation between two thermally-different regions. However, creating an effective insulating layer may also be approached by minimizing the "thermal substrate" itself. Thermal substrate can be contextually defined as the material that the thermal transfer occurs under. Utilizing this approach, it can be advantageous to reduce the material itself through what is typically referred to as "vacuum insulation." Integrating a vacuum insulation can mean creating a vacuum in the insulating layer. To this end, this would mean that the layer nearest the induction cooktop would have to be free of imposing any Faraday effect and could not block the electromagnetic signal from induction cooktop. Effective materials for said layer would be any materials that are not ferromagnetic, but still contain high strength characteristics to withstand the pressures imposed by the vacuum formation and subsequent user behavior (e.g., dropping, knocking, heating and cooling the article).

In further aspects, the insulating coating layer may be a lower durometer than typical metals used for cookware. A lower durometer exterior material than is used with typical metal or ceramic cookware reduces any scratching to surfaces said vessel comes in contact with. Additionally, a lower durometer material offers advantages when considering the increased friction between heating vessel and rest surface. Further, higher friction is desirable in order to create an increased stability of the cookware during use or storage. Lower durometer materials may also have sensory advantages when coming in contact with the user.

In various aspects, the insulating coating layer may allow for more versatile color options and geometry due to the difference in production methods and versatility of insulating coating formulation when compared to traditional metal or ceramic cookware. Additionally, in polymeric embodiments, the insulating coating layer may vary in geometry to a greater extent than traditional metal cookware potentially benefiting airflow, handling, interaction, aesthetics and/or insulation. Both can offer advantages when considering general usability for coated articles and heating vessels.

The insulating coating can comprise one or multiple, for example, 2, 3, 4 or more, individual layers of an insulating composition or formulation. In one aspect, the insulating coating comprises a single layer. In another aspect, the insulating coating comprises at least two layers. In one aspect, an insulating coating comprising a single layer can impart reduced manufacturing steps, improved aesthetic properties, improved insulating layer durability, or a combination thereof. It should be understood that any individual coating layer can comprise the same or a different composition than any other coating layer. In one aspect, at least two layers are present and comprise the same or similar composition. In another aspect, at least two layers are present, and at least one layer comprises a composition different from at least one other layer. Such a variation in composition can, in various aspects, provide desired properties and/or characteristics. Similarly, the thickness, and method of contacting or coating can be the same or different for different portions of the substrate or individual insulating coating layer. In one aspect, if two or more layer thicknesses are present, a first layer thickness may have a thickness effective to allow an electromagnetic signal to reach the substrate and a second layer thickness may have a thickness effective to allow grasping when the substrate has been heated using induction heating.

The resulting insulating coating comprises at least one of the following properties: low thermal conductivity, low durometer hardness, electromagnetically permeable, heat resistant, non-scratching, corrosion resistant, chemical resistant, low surface hardness, non-skid, and/or combinations thereof. In one aspect, the coating system of the present disclosure is durable and can withstand the stresses and conditions of high temperature inductive heating cookware and other applications. In another aspect, the insulating coating can withstand temperatures as high as 350° C. and can withstand sustained exposure to temperatures in the range of 100° C. to 250° C. In another aspect, the properties of the resulting insulating coating can be measured using $(\text{Shore A hardness}-47)^3$ times thermal conductivity of the insulating coating formulation. In a further aspect, the $(\text{Shore A hardness}-47)^3$ times thermal conductivity value of the insulating coating can be less than 40, for example, less than 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1, or less. In some aspects, values less than zero are permissible and high-performing.

In various aspects, the insulating coating can exhibit a smooth finish and/or an embossed or treated surface appearance. The insulating coating can, in some aspects, have a smooth finish. In other aspects, the insulating coating can have a treated surface appearance. For example, to improve cooling properties, the exterior surface of the insulating coating, for example, the surface configured to contact an inductive cooktop surface, can comprise a surface treatment or may be subjected to a surface treatment step. While not wishing to be bound by a particular theory, a surface treatment as described herein can increase or otherwise optimize the surface area creating additional cooling properties and therefore increasing usability and handling of coated articles and vessels. In further aspects, a surface treatment can comprise an embossed pattern, or elevated areas, such as, and without limitation, geometric protrusions or "fins", and combinations thereof. In still further aspects, the surface treatment may be used to lower the local temperature (and thus, the global temperature) of the coated article or vessel through the maximization of convection while minimizing conduction between handling or resting surface of the coated article or vessel. To this end, the heat build-up on the handling or resting surfaces. A single or series of protrusions from the substrate and/or the insulating coating may also allow for more aesthetic versatility. The aforementioned cooling geometries may be on any location or portion of the insulating coating. In further aspects, the surface treatment may provide a more direct benefit by including additional surface area geometries on the insulating layers on the underside base of the articles or vessel and/or on the handling surfaces and/or gripping portions. In further aspects, surface treatments, such as geometric protrusions, may also provide added benefit by including them on vertical surfaces, such as, for example, the exterior side walls. It is common in heat sink design to maximize the vertical convection flow that comes in contact with cooling surfaces by ensuring that the cooling surfaces themselves promote airflow. A horizontal surface would not be as efficient in promoting heat transfer through because hot airflow travels upward thereby horizontal surfaces would stop fluid or gas flow.

It should be appreciated that the inventive methods and insulating coating compositions recited herein can provide a durable, insulating coating layer to various ferromagnetic substrates and surfaces used for inductive heating. Other methods and compositions known in the art can provide a non-scratching coating that does not exhibit sufficient insulative properties to allow grasping by a user during use. The approach of the current invention provides a durable, insulating coating effective to overcome these and other shortcomings. The insulative coating compositions of the present disclosure and ferromagnetic substrates subjected to the methods described herein, can be useful in a variety of applications. In various aspects, such coated substrates can be useful in inductive cookware and made of steel or iron, and heating vessels, or other articles useful in liquid-based cooking and heating applications.

As briefly discussed above, the present disclosure, in further aspects, also provides coated articles and vessels for use with induction heating. In one aspect, disclosed herein is an article for use with induction heating or cooking, the article comprising a ferromagnetic substrate and a disclosed insulating coating layer attached to the substrate. In further aspects, the insulating coating layer can comprise an insulating composition comprising: (i) from 51 to 100 vol % of a base material, and (ii) from 0 to 49 vol % of a thermally insulative filler with an intrinsic thermal conductivity less than about 1.0 W/mK. In still further aspects, the insulating composition is characterized by: (1) a thermal conductivity of less than about 1.0 W/mK; (2) a Shore A Hardness of less than about 70; and (3) a (Shore A hardness-"durometer"-47)$^3$ times thermal conductivity value of no greater than about 40. The insulating coating layer is effective to allow passage of an electromagnetic signal through the insulating layer to the substrate. For example, when the article or vessel is placed on an induction cooktop, the insulating coating layer is effective to allow passage of all or substantially all electromagnetic signal from the induction cooktop through the insulating layer to the substrate.

Advantageously, articles of the present disclosure are capable of being directly grasped by a user after the ferromagnetic substrate is heated to 240° F. during induction heating or cooking, for example, up to temperatures of 330° F. or more during induction heating or cooking. In further aspects, the disclosed articles may comprise induction cookware, such as a pot or skillet, and/or heating vessels, such as a kettle or the like. In still further aspects, the article has a base surface or wall and one or more side walls. In yet further aspects, the base has a diameter of at least about 4 inches, for example, about 4.5 or 5 inches, or larger.

In further aspects, the side walls may angle inward from the outer edge of the base wall. In some aspects, the side walls and base walls may form an angle from about 30 degrees to about 75 degrees. In other aspects, the side walls and base walls may form an angle from about 45 degrees to about 60 degrees. In still further aspects, the article may have a substantially conical shape. In further aspects, the side walls may define an opening of the article or vessel. In still further aspects, the article may have a vessel opening comprising a first diameter and a vessel base comprising a base diameter equal to or larger than the first diameter. In yet further aspects, the article may have a vessel opening comprising a first diameter and a vessel base comprising a base diameter at least 35% larger than the first diameter, for example, at least about 40, 45, 50, 55, 60, 65, 70, 75, 80, 85, 90, 95, or 100% larger. In still further aspects, the article may have a vessel opening comprising a first diameter and a vessel base comprising a base diameter at least twice as large as the first diameter.

In various aspects, the side walls may comprise a first portion that angles inward from the outer edge of the base, and a second portion that angles outward towards the outer edge of the base. In further aspects, the side walls may comprise a first side wall segment having first and second opposed ends, the first ends of the first side wall segment connected to the base and the second ends of the first side wall segment angled inwards from the outer edge of the base; and a second side wall segment having first and second opposed ends, the first end of the second side wall segment connected to the second end of the first side wall segment and the second end of the second side wall segment angled outward towards the outer edge of the base. In still further aspects, the second ends of the first side wall segment may define a first opening having a first diameter. In yet further aspects, the second end of the second side wall segment may define a second opening having a second diameter. In even further aspects, the junction of the first end of the second side wall segment and the second end of the first side wall segment may define a gripping portion for holding by a user.

In some aspects, the second side wall segment may define a pouring portion configured to pour a liquid from within the article or vessel. In other aspects, the article may comprise side walls that angle inward from the outer edge of the base wall to a first diameter, and then angle outward to a second diameter.

In further aspects, the side walls may comprise an insulating coating layer having a first thickness. In still further aspects, the base wall may comprise an insulating coating layer having a second thickness. In yet further aspects, the side walls may comprise an insulating coating layer having a first thickness, and the base wall may comprise an insulating coating layer having a second thickness. In some aspects, the side walls comprise an insulating coating layer having a thickness of at least about 0.18 inches. In other aspects, the side walls may comprise an insulating coating layer having a thickness from about 0.18 inches to about 1.0 inches. In still other aspects, the base wall may comprise an insulating coating layer having a thickness of less than about 0.30 inches.

According to various aspects of the invention, the methods, articles and vessels of the present disclosure can comprise multiple configurations. FIGS. 1-9B illustrate non-limiting examples of embodiments of operating environments, constructions, and components for the disclosed articles and vessels. Although the operating environments, elements, and components are disclosed with specific functionality, it should be understood that functionality may be shared between elements and/or components, with some functions split between elements and/or components, while other functions duplicated by the elements and/or components. Furthermore, the name of the elements and/or components should not be construed as limiting upon the functionality of the elements and/or components. Moreover, each stage or step in the claim language can be considered independently without the context of the other stages. Each stage or step may contain language defined in other portions of this specifications. Each stage disclosed for one element and/or component may be mixed with the operational stages of another elements and/or component. Each stage or step disclosed herein can be claimed on its own and/or interchangeably with other stages of other elements and/or components.

Figure 2:
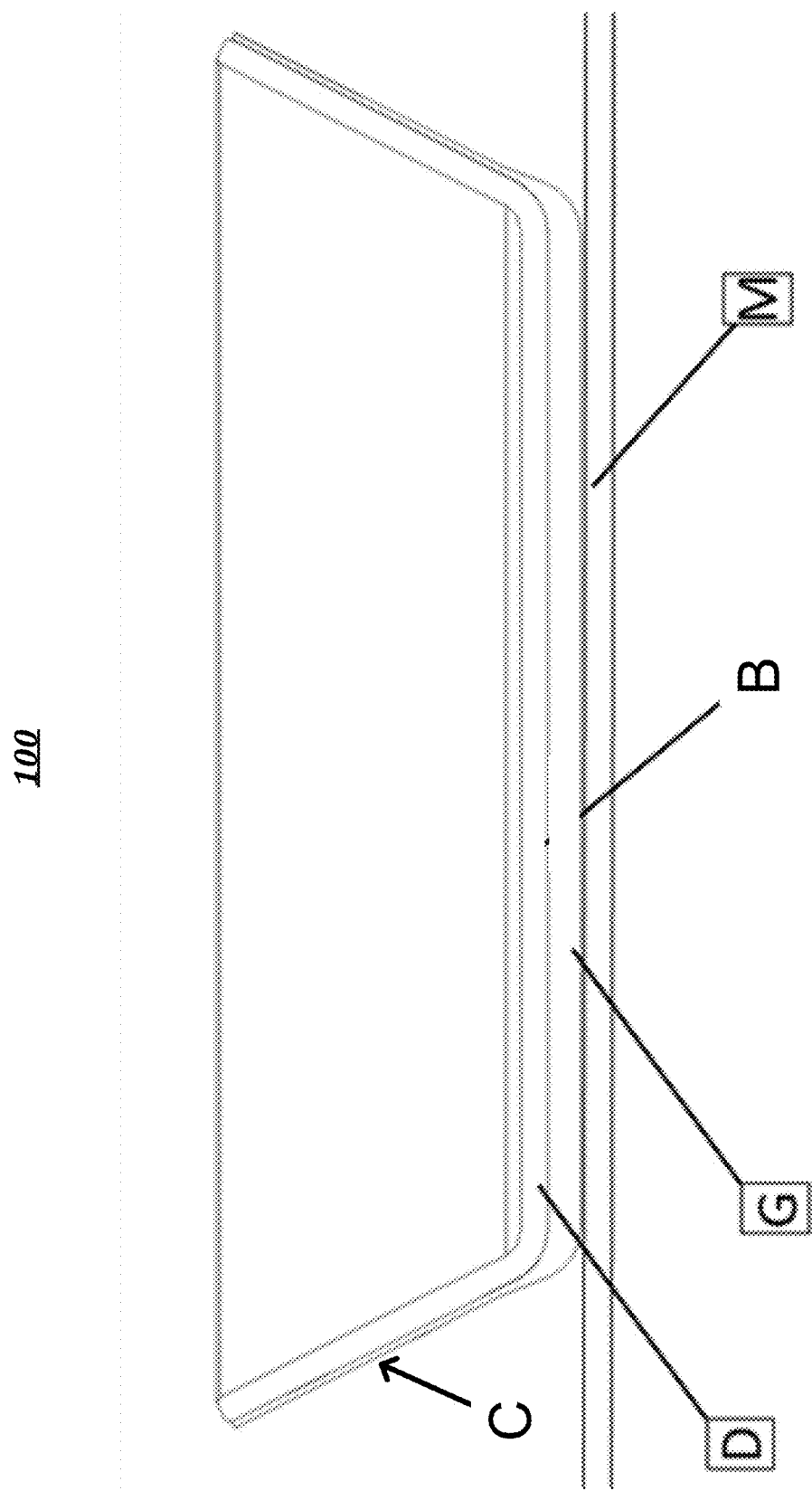
FIG. 2 illustrates a heating vessel construction in accordance with an exemplary embodiment of the present invention.

In one aspect, FIG. 1 shows an exemplary heating vessel (100) in accordance with an embodiment of the present invention. Heating vessel (100) generally comprises a base or bottom surface (B) and side walls (C), and is configured to be used with an induction stove or cooktop (M), which is typically a glass surface. As shown in FIG. 2, heating vessel (100) is constructed with an insulating layer (G) attached to a ferromagnetic substrate (D). In some embodiments, side walls (C) may be made of a non-ferrous material. To this end, certain advantages exist if side walls are not constrained to the same ferromagnetic properties that the bottom surface (B) must have to properly receive electromagnetic energy transfer. In further aspects, non-ferromagnetic materials may contain certain properties that allow the user to view inside the vessel, or may pose weight advantages, or may pose manufacturing advantages, or may pose cost advantages or otherwise.

In some embodiments, there may be an opening (F) in the insulating layer (G) to expose the ferromagnetic substrate (D). It is not uncommon for induction cooktops to include a thermal feedback loop through use of infrared detection. This allows the induction cooktop's computer to read the cookware's working temperature and, in-turn, better adjust the electromagnetic output, e.g., heating vessel's temperature. To get a more accurate reading, the infrared (IR) beam may be able to have line-of-sight to the ferromagnetic metal layer (D) on bottom surface (B). Getting a reading on the ferromagnetic metal layer (D) may be important because it most represents the temperature the food or liquid items within the vessel are. In embodiments that do include opening in the insulating layer, it would have advantages to locate the opening in the central region of the pan, as this is a typical location for the IR reader to be located on the induction cooktop.

Figure 3:
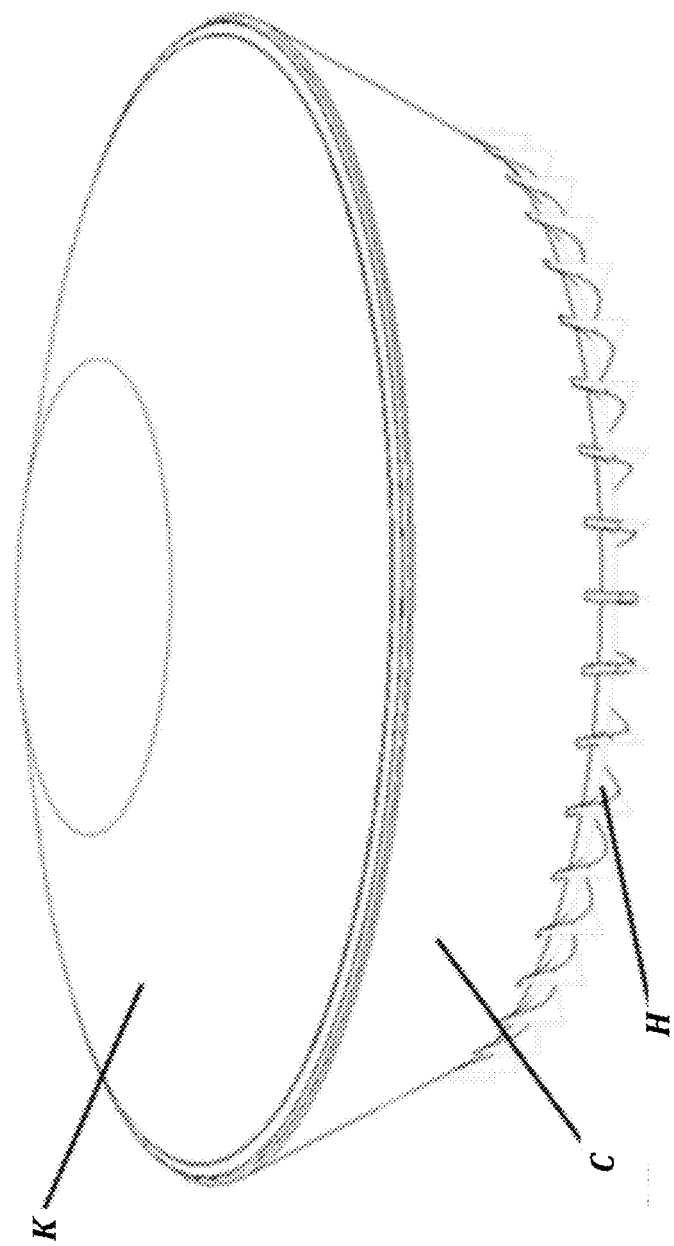
FIG. 3 illustrates a heating vessel in accordance with another exemplary embodiment of the present invention.
Figure 4A:
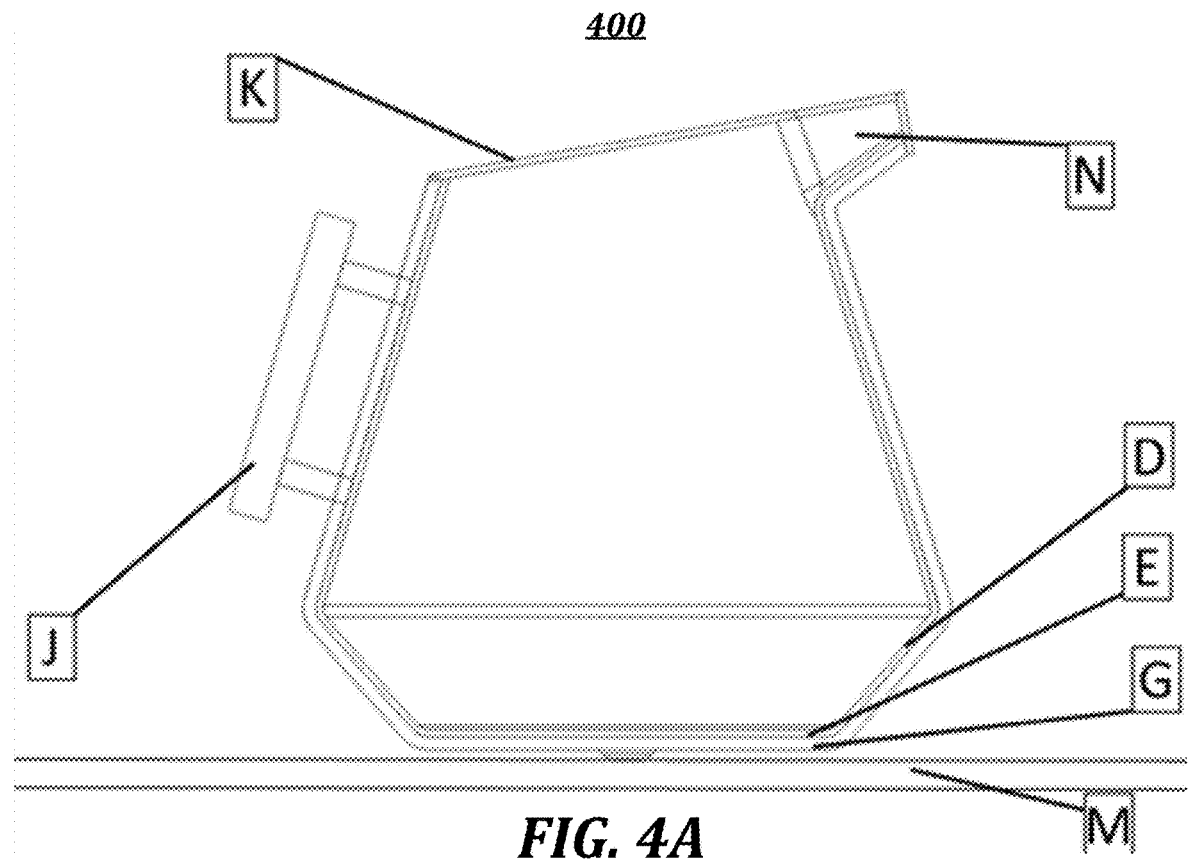
FIGS. 4A-4B illustrate a heating vessel in accordance with another exemplary embodiment of the present invention.
Figure 4B:
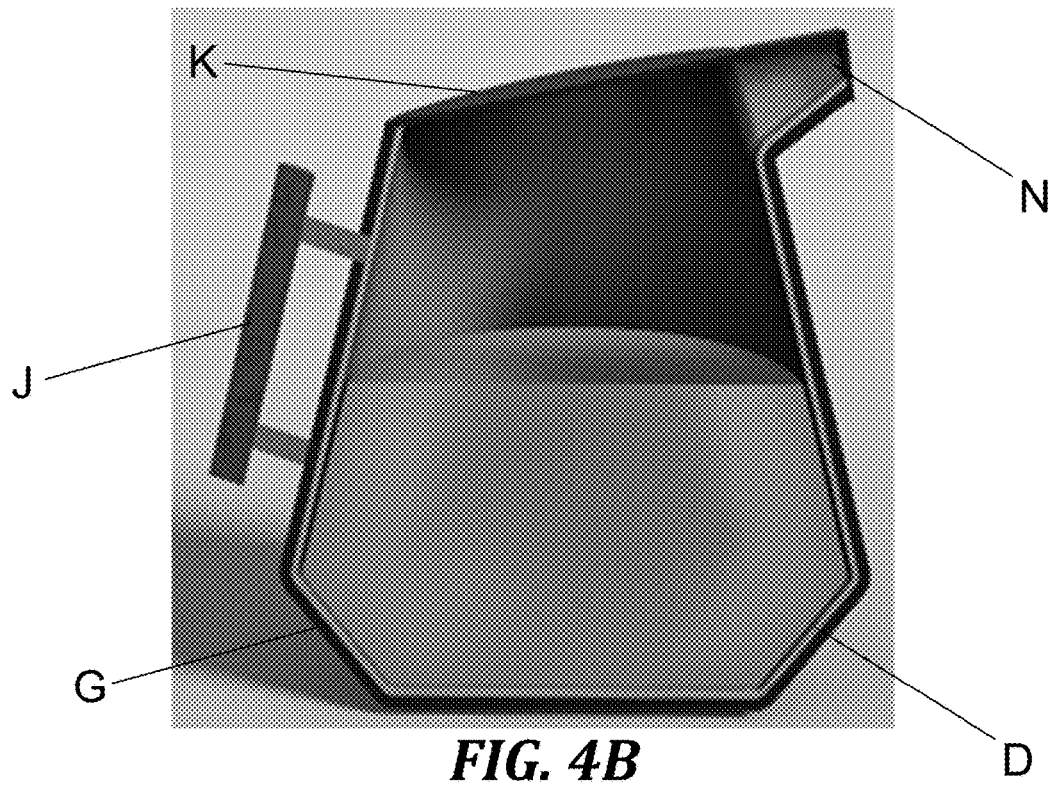
Figure 5A:
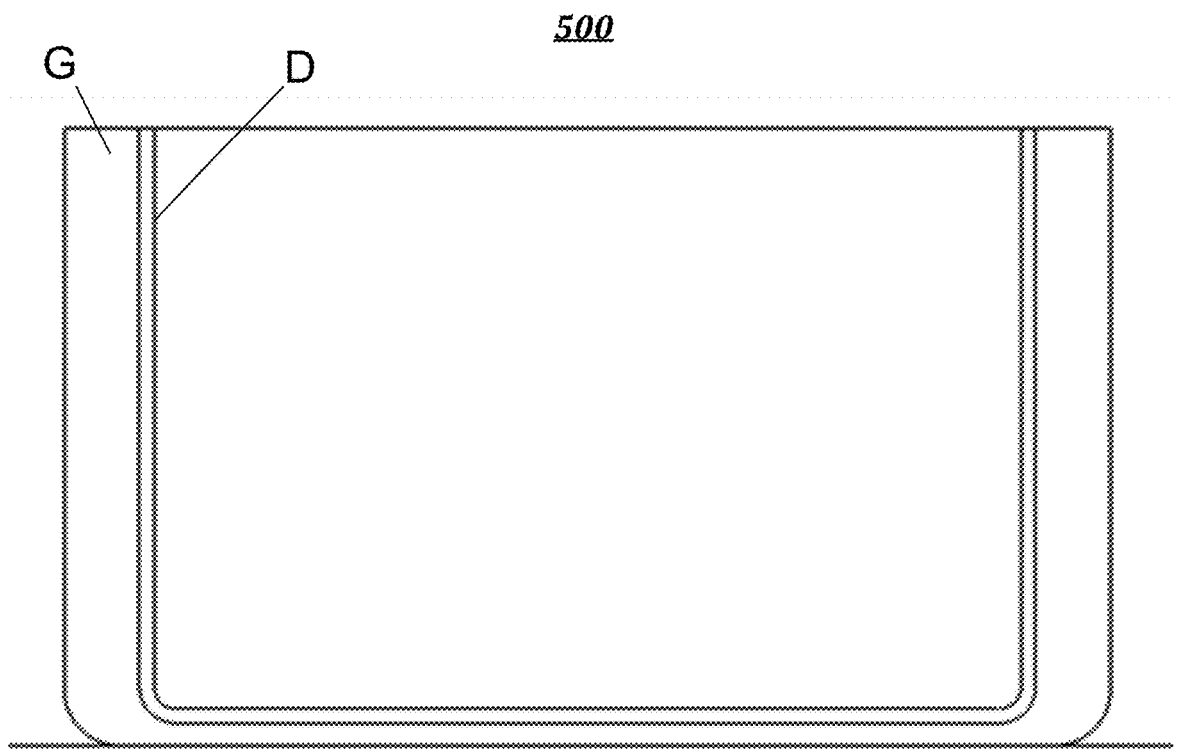
FIGS. 5A-5B illustrate a heating vessel in accordance with another exemplary embodiment of the present invention.
Figure 5B:
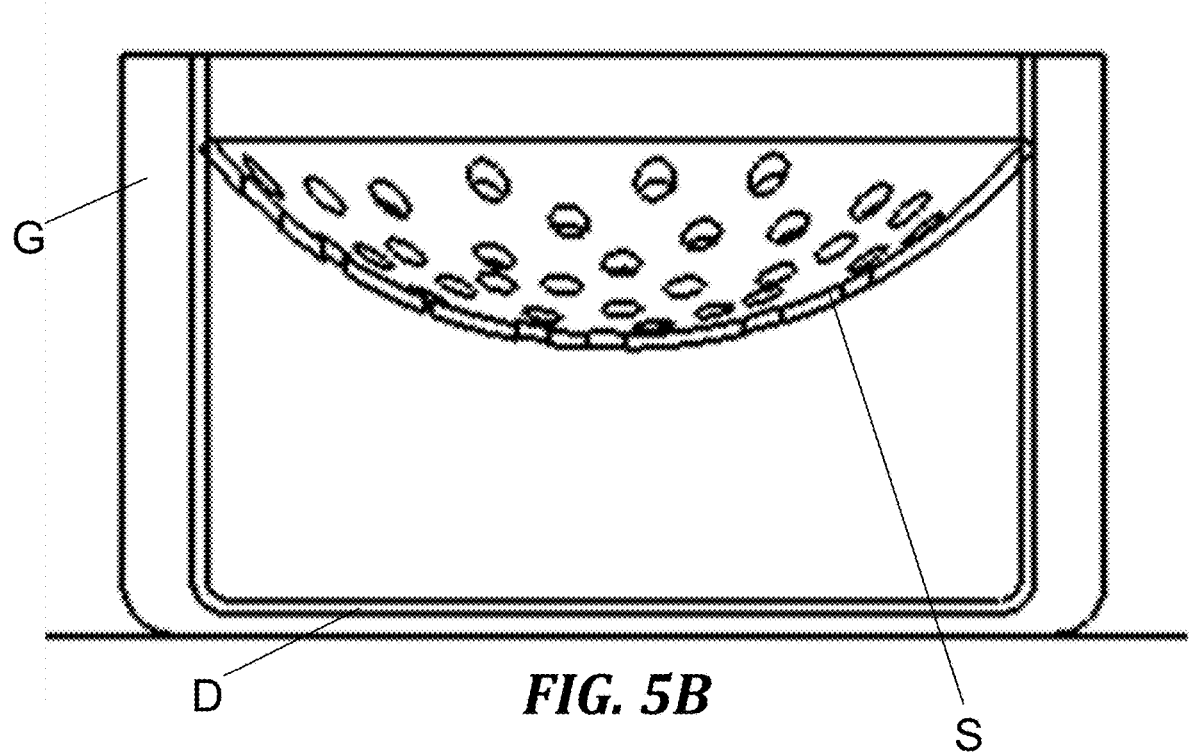
Figure 6A:
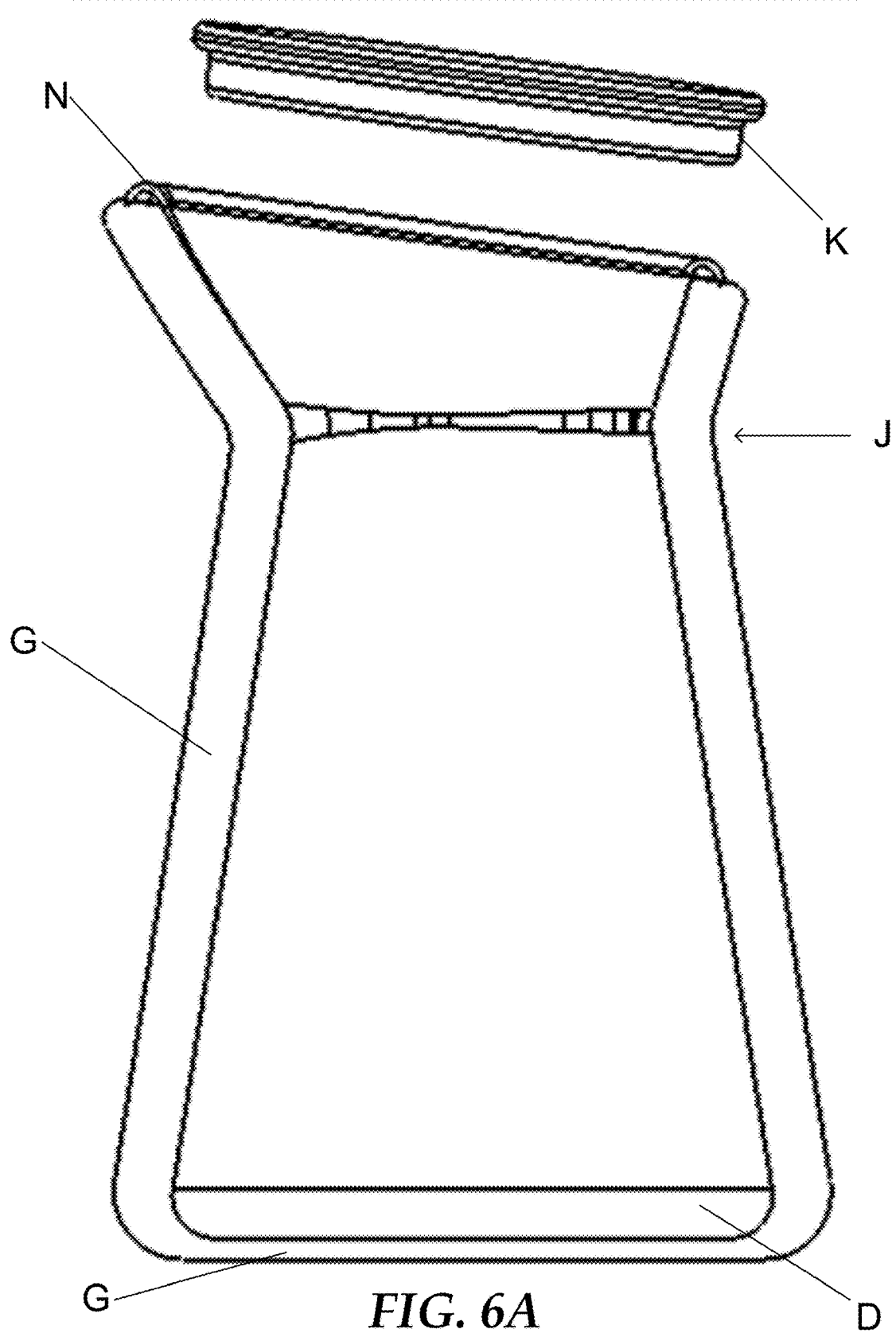
FIGS. 6A-6B illustrate a heating vessel in accordance with another exemplary embodiment of the present invention.
Figure 6B:
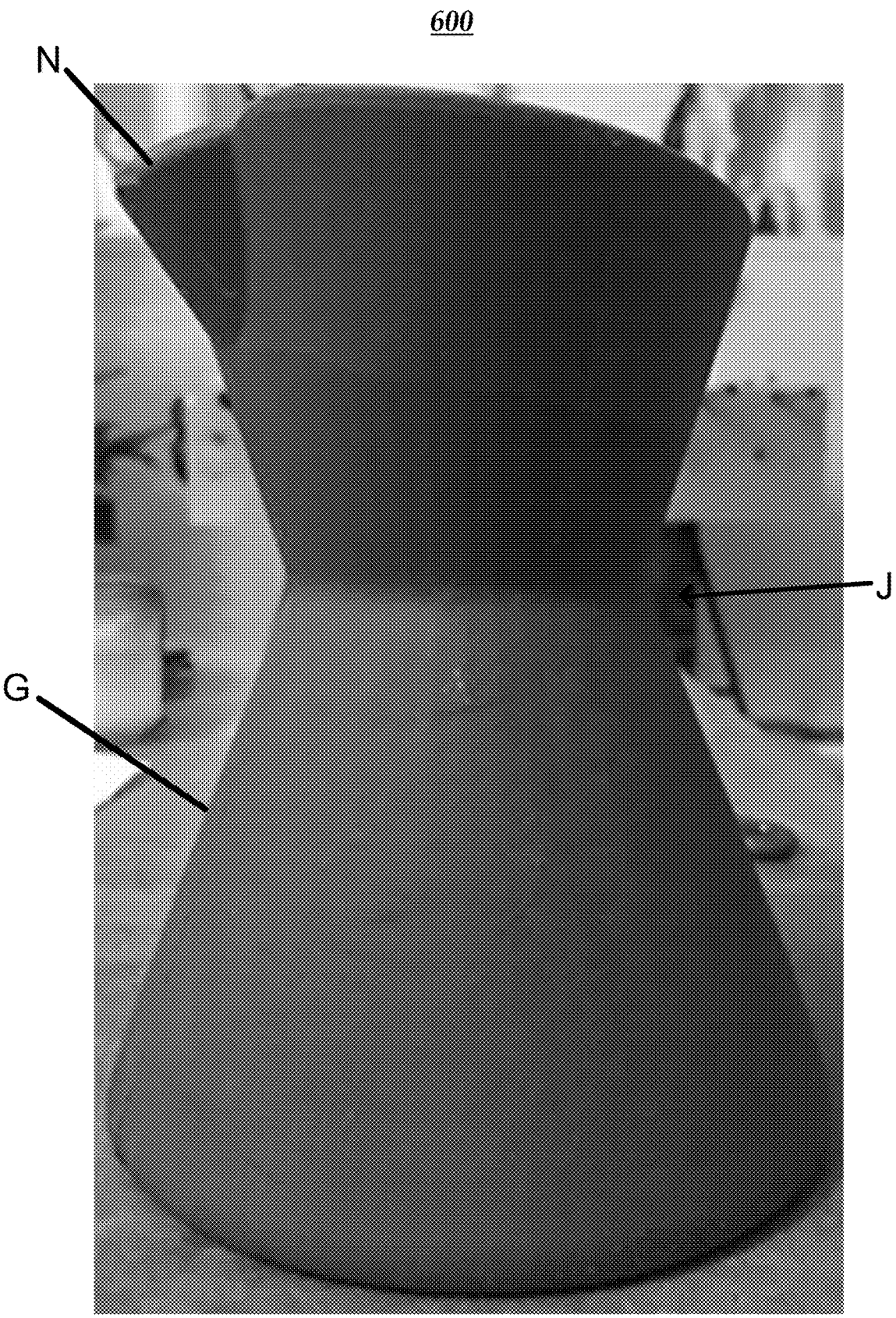

While this embodiment of heating vessel (100) is shown in a specific form, other heating vessel embodiments may have different forms while maintaining the minimal subsequent features. For example, in accordance with additional exemplary embodiments of the present invention, FIG. 3 shows heating vessel (300) in the form of a pan, FIGS. 4A-4B show heating vessel (400) in the form of a tea kettle, FIGS. 5A-5B show heating vessel (500) in the form of a pot, and FIGS. 6A-6B show heating vessel (600) in the form of a kettle. As shown, heating vessel of the present invention may further comprise an optional handle (J), an optional spout or lip (N) for pouring food or liquid, an optional lid or cover (K), optional steaming baskets (S), optional double-boiling vessels, or an optional whistle (N), or combinations thereof.

In various embodiments, optional gripping or handle component (J) used for stabilizing, moving, lifting, holding or turning the heating vessel during storage, cooking, heating, drinking, pouring, serving or eating. The handle component (J) may not be present, be removable or permanently attached. The form of said handle component or components may vary, but should provide gripping or handling surface(s) for a human hand, for example, for use with hands with or without the use of gloves. During heating, the optional handle component should be a lower temperature than the interior heating surface and as such, may have a spacing device to provide a thermal barrier between ferromagnetic substrate and/or insulating layer and handling surface. This spacing device may be a thermally-insulating material that allows mechanical attachment of the handle to the heating vessel. In some embodiments, the handle may be integrated with heating vessel without the need for additional mechanical components or attachment means. The handle may also be comprised of a different material or geometry, for example, materials or geometries offering more advantageous cooling or insulating properties. As shown in FIGS. 6A-6B, the shape of heating vessel (600) can create an integrated gripping area (J) for easy holding and pouring.

In other embodiments, heating vessel of the present invention may include an optional removable and/or movable lid (K). Lids are common in cookware to increase internal heating temperature as well as heating uniformity on the food or liquid and not just limited heating from the internal surface of the vessel. In still other embodiments, heating vessel may include a whistle (N). Optional whistle (N) would be located on an integrated spout or lid area of the heating vessel. As hot air (or air mixture) expands and rises, the pressure differential induces a single or multi-tone through said whistle. In further aspects, there may be advantages to integrating a whistle into the heating vessel. Typically, the whistle component is optimized to alert the heating vessel user when the inner vessel temperatures exceed predetermined threshold. In heating vessels designed for boiling water, the whistle tone is optimized to sound when the inner-vessel temperature of the air and/or liquid is around boiling (or 212° F.). This indicates to the user that their water is ready for consumption or use. In yet other embodiments, optional steaming baskets (S) may be included to expand cooking methods that can used in connection with the disclosed heating vessels.

In various aspects, heating vessel, which would normally be thermally vulnerable or hot to the touch in the absence of the insulating layer, may be safely touched by a user due to the insulative properties and/or geometry of the insulating layer (G). In further aspects, insulating layer (G) may comprise a lower durometer than ferromagnetic substrate (D) and, therefore, improve and reduce scratching and/or sliding to or on surfaces that heating vessel (A) comes in contact with. Non-limiting end-uses of said heating vessel (A) may include, but not limited to, heating, cooking, frying, storing, serving, drinking or eating from and each scenario benefits from said embodiment. These benefits may include, but are not limited to: less cookware or plateware or food storage containers to be used, no trivets or oven mits to be used, ergonomic handling and/or safe handling during use.

In various embodiments, the heating vessel (A) includes two or more layers adjacent to one another. On the base or bottom surface, the layers comprise of a ferromagnetic substrate (D) and an insulating coating layer (G). Insulating layer (G) may cover a portion or the entire ferromagnetic substrate (D). Additional layers and/or voids may be employed to promote thermal separation of cooking surface and exterior surfaces. Voids may be used to visually indicate status of internal foods or liquids.

Figure 7A:
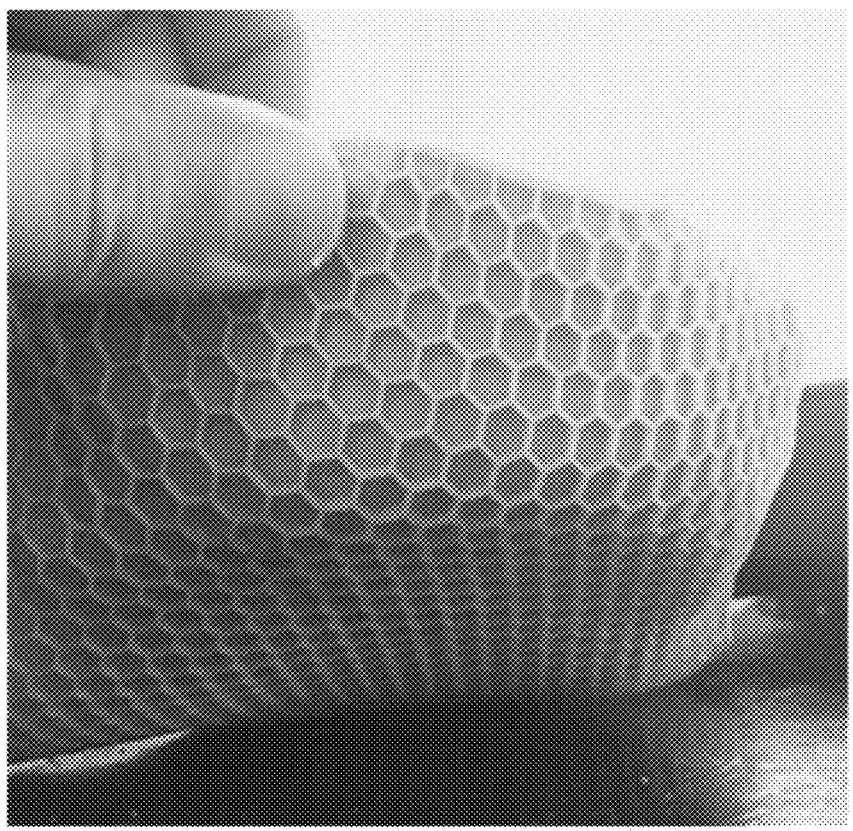
FIGS. 7A-7B illustrate a surface treatment for use in conjunction with the disclosed heating vessels in accordance with an exemplary embodiment of the present invention.
Figure 7B:
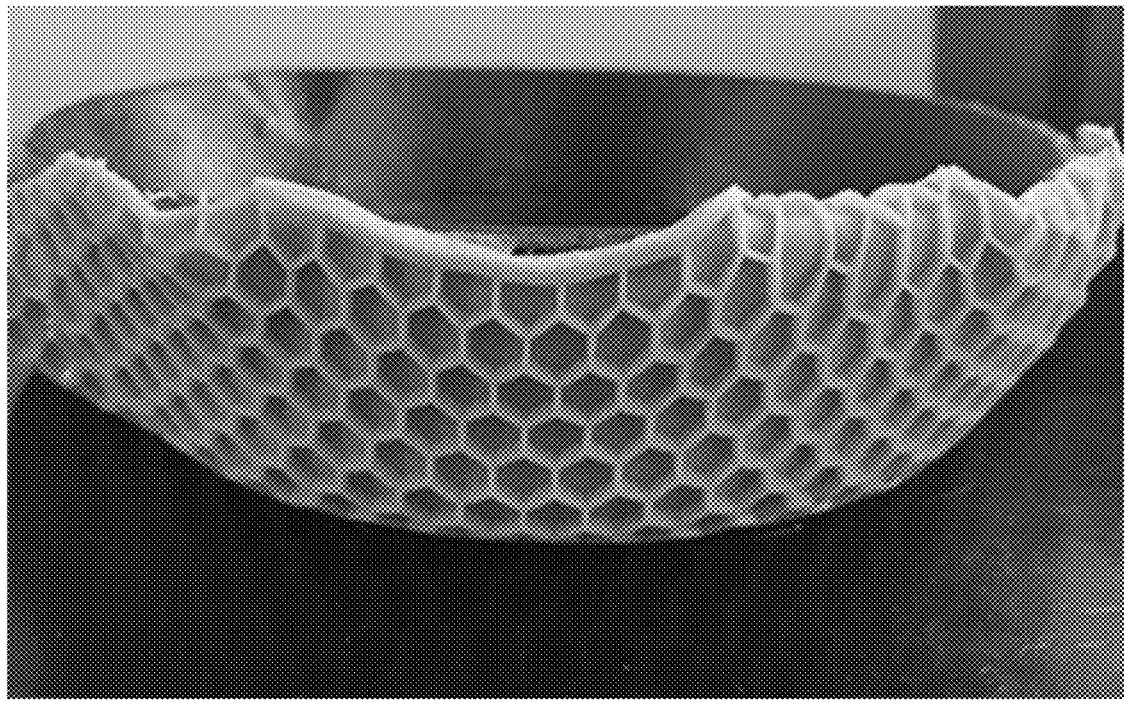
Figure 8:
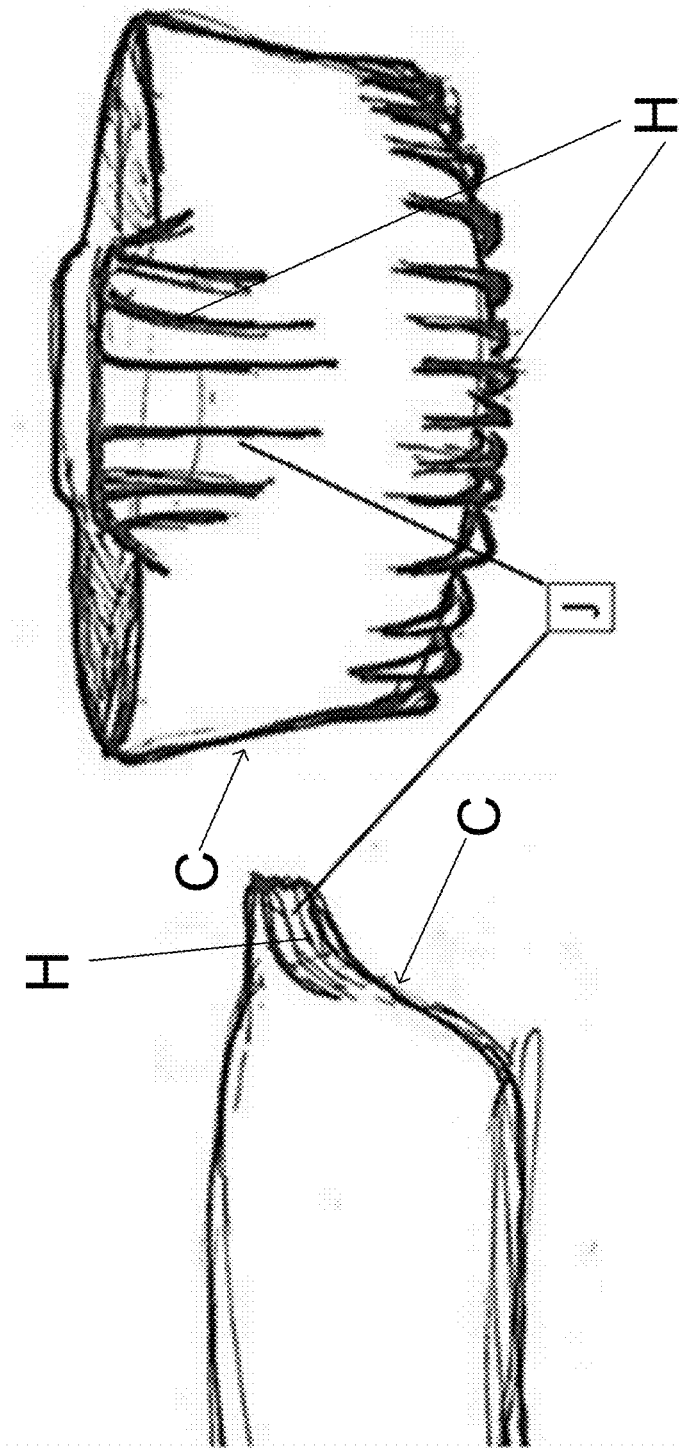
FIG. 8 illustrates a heating vessel in accordance with an exemplary embodiment of the present invention.

Embodiments of the disclosed articles and vessels may comprise a surface treatment to alter to increase or otherwise optimize the surface area creating additional cooling and therefore increasing usability and handling. Geometric protrusions, or various forms of "fins," (H) may be used to lower the local (therefore global) temperature of the cookware through the maximization of convection whilst minimizing conduction between handling or resting surface and cookware (therefore not transmitting heat to handler or surfaces and damaging). A single or series of protrusions from the conducting and/or the insulating layer may also allow for more aesthetic versatility. The aforementioned cooling geometries may be on any location of the cookware, but may provide a more direct benefit by including additional surface area geometries on the insulating layers on the underside of the vessel and/or on the handling surfaces. As shown in FIGS. 7A-8, Geometric protrusions may also provide added benefit by including them on vertical surfaces (C) (such as the exterior walls, for example). It is common in heat sink design to maximize the vertical convection flow that comes in contact with cooling surfaces by ensuring that the cooling surfaces themselves promote airflow. A horizontal surface would not be as efficient in promoting heat transfer through because hot airflow travels upward thereby horizontal surfaces would stop fluid or gas flow. Additionally, heating vessels have bottom surface (B) which are predominantly horizontal surfaces, but may vary slightly to promote thermal convection away from the vessel's center. In some embodiments, these geometric protrusions may also be used as "standoffs" to lift the vessel from the induction surface. Separating the vessel from the cooktop surface may promote airflow.

Figure 9A:
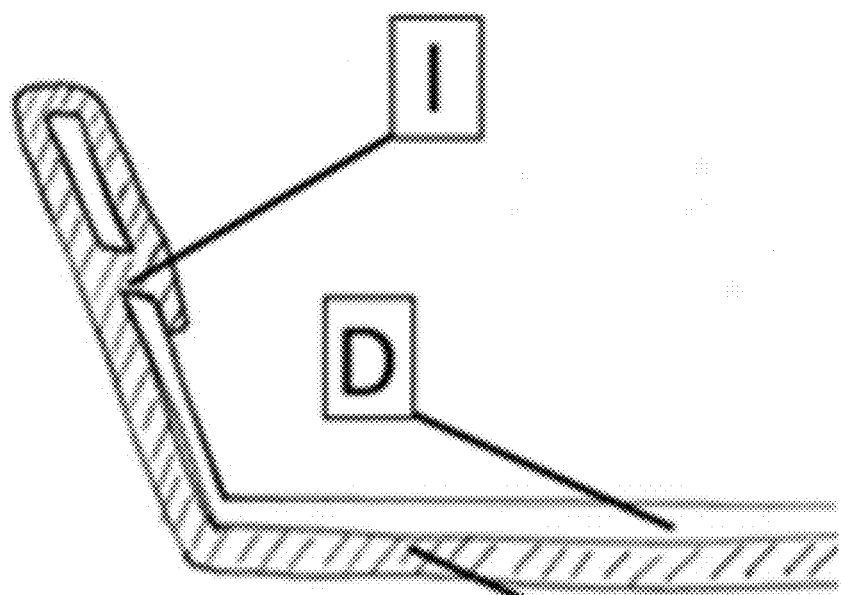
FIGS. 9A-9B illustrate heating vessel constructions in accordance with other exemplary embodiments of the present invention.
Figure 9B:
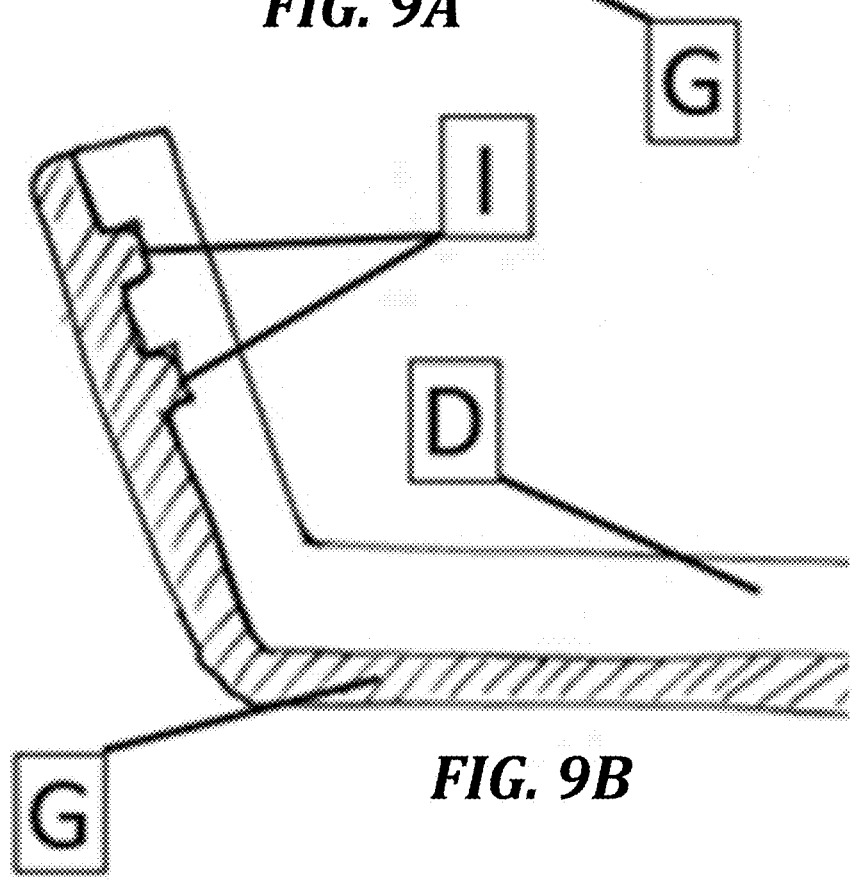

As shown in FIGS. 9A-9B, insulating layer (G) and ferromagnetic substrate (D) may include geometric variations (I) to increase adhesion properties between layers during the manufacturing process. It is common in manufacturing overmolding or co-molding or in the use of adhesives to vary bonding geometries in order to increase total surface area between two mating surfaces. Generally, more surface area between two molded parts correlates to higher bond strength. Varied surfaces may be on bottom, sides, top or interior of heating vessel. Alternatively, in order to also maintain adhesion through production, use and thermal variation there may be openings or holes in the ferromagnetic substrate or insulating layer. This can allow the insulating surface to maintain continuity through the ferromagnetic substrate which can increase the overall likelihood of adhesion of the insulating coating material to the interior ferromagnetic substrate. Additionally, this would increase strength of insulating material as it would be geometrically fully constrained. While material adhesion may be a source of mechanical bind, adhesive alternatives may pose benefits through cost, effectiveness, manufacturing or otherwise. Insulating layer may also cover portions of the interior concavity of the vessel in order to increase adhesion properties to metal. This may provide additional handling surfaces which will lessen the likelihood of exposing high heat to the handler.

The present invention includes at least the following aspects: Aspect 1: An article for use with induction heating or cooking, the article comprising: a ferromagnetic substrate and an insulating coating layer attached to the substrate, wherein the insulating coating layer comprises an insulating composition comprising: (i) from 51 to 100 vol % of a base material, and (ii) from 0 to 49 vol % of a thermally insulative filler with an intrinsic thermal conductivity less than about 1.0 W/mK; wherein the insulating composition is characterized by: (1) a thermal conductivity of less than about 1.0 W/mK; (2) a (Shore A hardness-"durometer"-47)$^3$ times thermal conductivity value of no greater than about 40.

Aspect 2: The article of any preceding aspect, wherein the insulating coating layer has a (Shore A hardness-"durometer"-47)3 times thermal conductivity value of no greater than about 20.

Aspect 3: The article of any preceding aspect, wherein the article is capable of being directly grasped by a user after the ferromagnetic substrate is heated to 240° F. during induction heating or cooking.

Aspect 4: The article of any preceding aspect, wherein the article is capable of being directly grasped by a user after the ferromagnetic substrate is heated to 330° F. during induction heating or cooking.

Aspect 5: The article of any preceding aspect, wherein the article is heat resistant to at temperature of least about 350° C. generated by the ferromagnetic substrate during induction heating.

Aspect 6: The article of any preceding aspect, wherein the insulating coating layer is effective to allow passage of an electromagnetic signal through the insulating layer to the substrate.

Aspect 7: The article of any preceding aspect, wherein article is placed on an induction cooktop, the insulating coating layer is effective to allow passage of substantially all electromagnetic signal from the induction cooktop through the insulating layer to the substrate.

Aspect 8: The article of any preceding aspect, wherein the article is a vessel.

Aspect 9: The article of any preceding aspect, wherein the article is a kettle.

Aspect 10: The article of any preceding aspect, wherein the article has a base diameter of at least about 4 inches.

Aspect 11: The article of any preceding aspect, wherein the article comprises one or more side walls.

Aspect 12: The article of any preceding aspect, wherein the article comprises side walls that angle inward from the outer edge of the base wall.

Aspect 13: The article of any preceding aspect, wherein the side walls and base walls form an angle less than 89 degrees.

Aspect 14: The article of any preceding aspect, wherein the side walls and base walls form an angle from about 50 degrees to about 80 degrees.

Aspect 15: The article of any preceding aspect, wherein the article has a substantially conical shape.

Aspect 16: The article of any preceding aspect, wherein the side walls define an opening of the article or vessel.

Aspect 17: The article of any preceding aspect, wherein the article has a vessel opening comprising a first diameter and a vessel base comprising a base diameter equal to or larger than the first diameter.

Aspect 18: The article of any preceding aspect, wherein the article has a vessel opening comprising a first diameter and a vessel base comprising a base diameter at least 35% larger than the first diameter.

Aspect 19: The article of any preceding aspect, wherein the article has a vessel opening comprising a first diameter and a vessel base comprising a base diameter at least twice as large as the first diameter.

Aspect 20: The article of any preceding aspect, wherein the side walls comprise a first portion that angles inward from the outer edge of the base, and a second portion that angles outward towards the outer edge of the base.

Aspect 21: The article of any preceding aspect, wherein the side walls comprise a first side wall segment having first and second opposed ends, the first ends of the first side wall segment connected to the base and the second ends of the first side wall segment angled inwards from the outer edge of the base; and a second side wall segment having first and second opposed ends, the first end of the second side wall segment connected to the second end of the first side wall segment and the second end of the second side wall segment angled outward towards the outer edge of the base.

Aspect 22: The article of any preceding aspect, wherein the second ends of the first side wall segment define a first opening having a first diameter.

Aspect 23: The article of any preceding aspect, wherein the second end of the second side wall segment define a second opening having a second diameter.

Aspect 24: The article of any preceding aspect, wherein the junction of the first end of the second side wall segment and the second end of the first side wall segment defines a gripping portion for holding by a user.

Aspect 25: The article of any preceding aspect, wherein the second side wall segment defines a pouring portion configured to pour a liquid from within the article or vessel.

Aspect 26: The article of any preceding aspect, wherein the article comprises side walls that angle inward from the outer edge of the base wall to a first diameter, and then angle outward to a second diameter.

Aspect 27: The article of any preceding aspect, wherein the article comprises side walls comprising an insulating coating layer having a first thickness, and base wall comprising an insulating coating layer having a second thickness.

Aspect 28: The article of any preceding aspect, wherein the comprises side walls comprise an insulating coating layer having a first thickness, and base wall comprising an insulating coating layer having a second thickness.

Aspect 29: The article of any preceding aspect, wherein the side walls comprise an insulating coating layer having a thickness of at least about 0.18 inches.

Aspect 30: The article of any preceding aspect, wherein the side walls comprise an insulating coating layer having a thickness from about 0.18 inches to about 1.0 inches.

Aspect 31: The article of any preceding aspect, wherein the base wall comprises an insulating coating layer having a thickness of less than about 0.25 inches.

Aspect 32: The article of any preceding aspect, wherein the insulating coating layer forms a single coating layer with the ferromagnetic substrate.

Aspect 33: The article of any preceding aspect, wherein the insulative filler comprises soda borosilicate glass, glass bead, glass fiber, $H_2Mg_3(SiO_3)_4$ (Talc), $CaCO_3$ (Calcium Carbonate), $Mg(OH)_2$ (Magnesium hydroxide), Mica, BaO (Barium oxide), Q-AlO(OH) (Boehmite), Q-AlO(OH) (Diaspore), $Al(OH)_3$ (Gibbsite), $BaSO_4$ (Barium sulfate), $CaSiO_3$ (Wollastonite), $ZrO_2$ (Zirconium oxide), $SiO_2$ (Silicon oxide), soda-lime-borosilicate glass, $MgO-xAl_2O_3$ (Magnesium aluminate), $CaMg(CO_3)_2$ (Dolomite), aerogel, cork, or a clay, or a combination thereof.

Aspect 34: The article of any preceding aspect, wherein the base material comprises silicone, urethanes, silica-derived insulation materials, polyolefins, high-temperature polymerics, polyamide-imides, polyphenylene sulfide, polyphenylene oxide, polystyrene, graphite, PTFE, polycarbonate plastic high temperature foam, moly or TPSiV (thermoplastic silicone vulcanization), or combinations thereof.

Aspect 35: The article of any preceding aspect, wherein the ferromagnetic substrate comprises a single layer substrate.

Aspect 36: The article of any preceding aspect, wherein the ferromagnetic substrate comprises a multi-layer or multi-ply substrate.

Aspect 37: A method for coating a ferromagnetic substrate, the method comprising: a) contacting at least a portion of a ferromagnetic substrate with an insulating coating formulation to form a first coating; wherein the insulating coating formulation comprises an insulating composition comprising: i) from 51 to 100 vol % of a base material; and ii) from 0 to 49 vol % of a thermally insulative filler with an intrinsic thermal conductivity less than about 1.0 W/mK; wherein the insulating composition is characterized by: (1) a thermal conductivity of less than about 1.0 W/mK; (2) a Shore A hardness of less than about 70; and (3) a (Shore A hardness-"durometer"-47)$^3$ times thermal conductivity value of no greater than about 40.

Aspect 38: The method of any preceding aspect, wherein the first coating has a thickness of from about 0.1 inches to about 1.0 inches.

Aspect 39: The method of any preceding aspect, wherein the ferromagnetic substrate comprises steel.

Aspect 40: The method of any preceding aspect, wherein the ferromagnetic substrate comprises iron.

Aspect 41: The method of any preceding aspect, wherein the substrate comprises a single piece of steel.

Aspect 42: The method of any preceding aspect, wherein the substrate comprises a low carbon steel.

Aspect 43: The method of any preceding aspect, wherein step a) comprises contacting at least a portion of a ferromagnetic substrate with an insulative coating formulation to form a single layer first coating.

Aspect 44: The method of any preceding aspect, wherein step a) comprises contacting at least a portion of a ferromagnetic substrate with one or more insulative coating formulations to form a multi-layer first coating.

Aspect 45: The method of any preceding aspect, wherein after the ferromagnetic substrate has a thickness of from about 0.01 inches to about 0.1 inches.

Aspect 46: The method of any preceding aspect, wherein the insulating composition comprises a silicone containing material.

Aspect 47: The method of any preceding aspect, wherein the insulating composition is capable of forming a coating using overmolding.

Aspect 48: The method of any preceding aspect, wherein the first coating is substantially resistant to cracking, tearing, or a combination thereof.

Aspect 49: The method of any preceding aspect, wherein the first coating can withstand temperatures of at least about 350° C. produced by the ferromagnetic substrate during inductive heating without damage.

Aspect 50: The method of any preceding aspect, wherein the first coating provides a non-scratch or substantially non-scratch surface.

Aspect 51: The method of any preceding aspect, wherein the first coating provides a non-skid or substantially non-skid surface.

Aspect 52: The method of any preceding aspect, wherein the first coating does not comprise an air pocket or space.

Aspect 53: The method of any preceding aspect, wherein the first coating does not comprise a thermally conductive material.

Aspect 54: The method of any preceding aspect, wherein the substrate is a substrate of inductive cooking vessel or article.

Aspect 55: An article produced by the method of any preceding aspect.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An article for use with induction heating or cooking, the article comprising: a ferromagnetic substrate and an insulating coating layer attached to the substrate, wherein the insulating coating layer comprises an insulating composition comprising: (i) a base material ranging from 51 to 100 vol %, and (ii) a thermally insulative material ranging from 0 to 49 vol % with an intrinsic thermal conductivity less than about 1.0 W/mK; wherein the insulating composition is characterized by: a ((composition's Shore A Hardness) minus 47)^3 multiplied by the insulating composition's (Thermal Conductivity value) of no greater than 40.

2. The article of claim 1, wherein the insulating coating layer has a ((composition's Shore A Hardness) minus 47)^3 multiplied by the composition's (Thermal Conductivity value) of no greater than 20.

3. The article of claim 1, wherein when the article is placed on an induction cooktop, the insulating coating layer is effective to allow passage of substantially all electromagnetic signal from the induction cooktop through the insulating layer to the substrate.

4. The article of claim 3, wherein the article comprises one or more side walls.

5. The article of claim 4, wherein side walls and base walls of the article form an angle of less than 89 degrees.

6. The article of claim 5, wherein the side walls define an opening of the article, and wherein the article has an opening comprising a first diameter and a base comprising a base diameter equal to or larger than the first diameter.

7. The article of claim 6, wherein the side walls comprise an insulating coating layer having a thickness from about 0.18 inches to 1.0 inches.

8. The article of claim 7, wherein the bottom base wall comprises an insulating coating layer having a thickness of less than 0.25 inches.

9. The article of claim 8, wherein the insulative filler comprises soda borosilicate glass, glass bead, glass fiber, H 2 Mg 3 (SiO 3) 4 (Talc), CaCO 3 (Calcium Carbonate), Mg(OH) 2 (Magnesium hydroxide), Mica, BaO (Barium oxide), —AlO(OH) (Boehmite), —AlO(OH) (Diaspore), Al(OH) 3 (Gibbsite), BaSO 4 (Barium sulfate), CaSiO 3 (Wollastonite), ZrO 2 (Zirconium oxide), SiO 2 (Silicon oxide), soda-lime-borosilicate glass, MgO.xAl 2 O 3 (Magnesium aluminate), CaMg(CO 3) 2 (Dolomite), aerogel, cork, or a clay, or a combination thereof.

10. The article of claim 9, wherein the base material comprises silicone, urethanes, silica-derived insulation materials, polyolefins, high-temperature polymerics, polyamide-imides, polyphenylene sulfide, polyphenylene oxide, polystyrene, graphite, PTFE, polycarbonate plastic high temperature foam, moly or TPSiV (thermoplastic silicone vulcanization), or combinations thereof.

11. The article of claim 10, wherein the ferromagnetic substrate comprises a single layer substrate.

12. The article of claim 10, wherein the ferromagnetic substrate comprises a multi-layer or multi-ply substrate.

13. The article of claim 10, wherein the article is a vessel.

14. The article of claim 10, wherein the article is a kettle.

15. The article of claim 14, wherein the side walls comprise a first side wall segment having first and second opposed ends, the first ends of the first side wall segment connected to the base and the second ends of the first side wall segment angled inwards from the outer edge of the base; and a second side wall segment having first and second opposed ends, the first end of the second side wall segment connected to the second end of the first side wall segment and the second end of the second side wall segment angled outward towards the outer edge of the base.

16. The article of claim 15, wherein the junction of the first end of the second side wall segment and the second end of the first side wall segment defines an integrated gripping portion capable of being held by a user's hand.

\* \* \* \* \*